Feb. 19, 1957 W. E. WHITE ET AL 2,781,901
BRICK CAGE
Filed Jan. 11, 1954 5 Sheets-Sheet 1

INVENTOR
*William E. White.*
AND *JOHN P. CLARK*
BY *R. S. A. Dougherty*
ATTORNEY Feb. 19, 1957 W. E. WHITE ET AL 2,781,901
BRICK CAGE
Filed Jan. 11, 1954 5 Sheets-Sheet 2
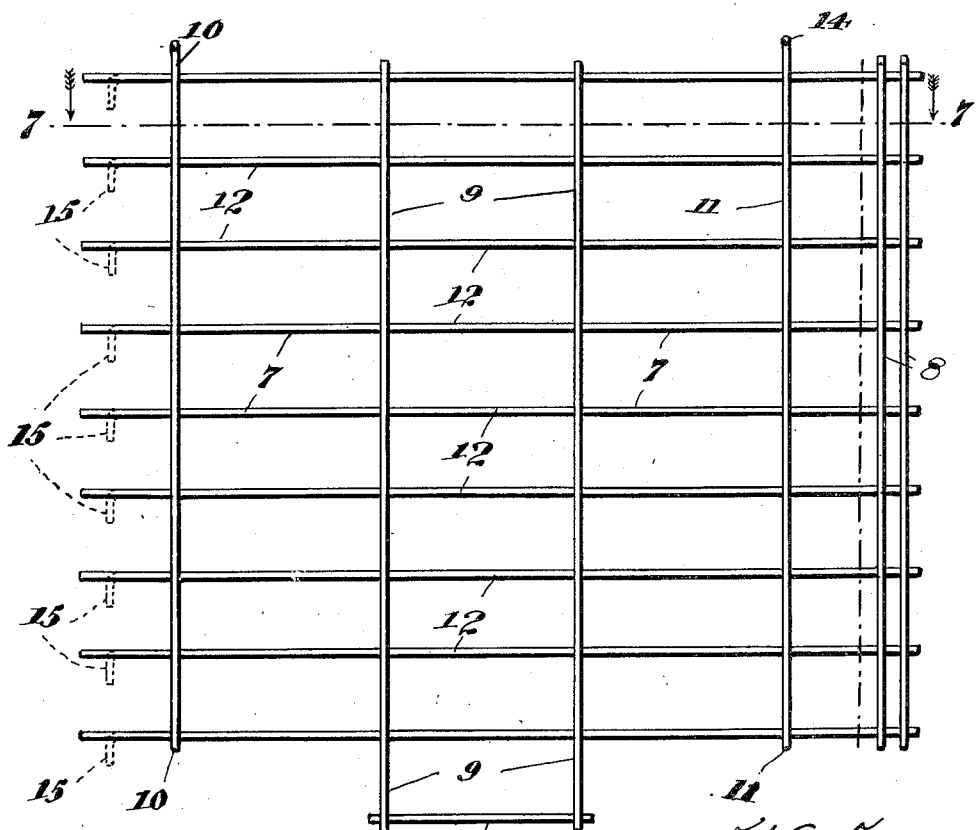
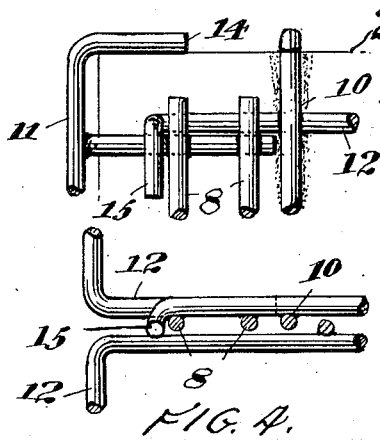
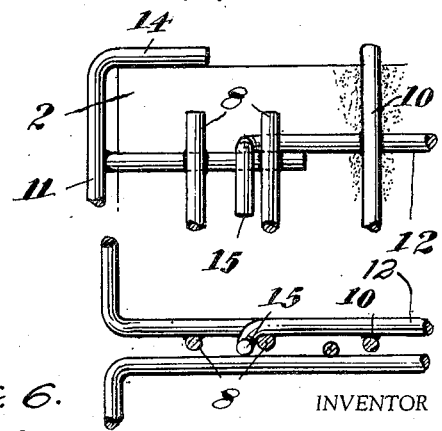
INVENTOR
William E. White.
AND JOHN R. CLARK
BY R. S. C. Dougherty
ATTORNEY

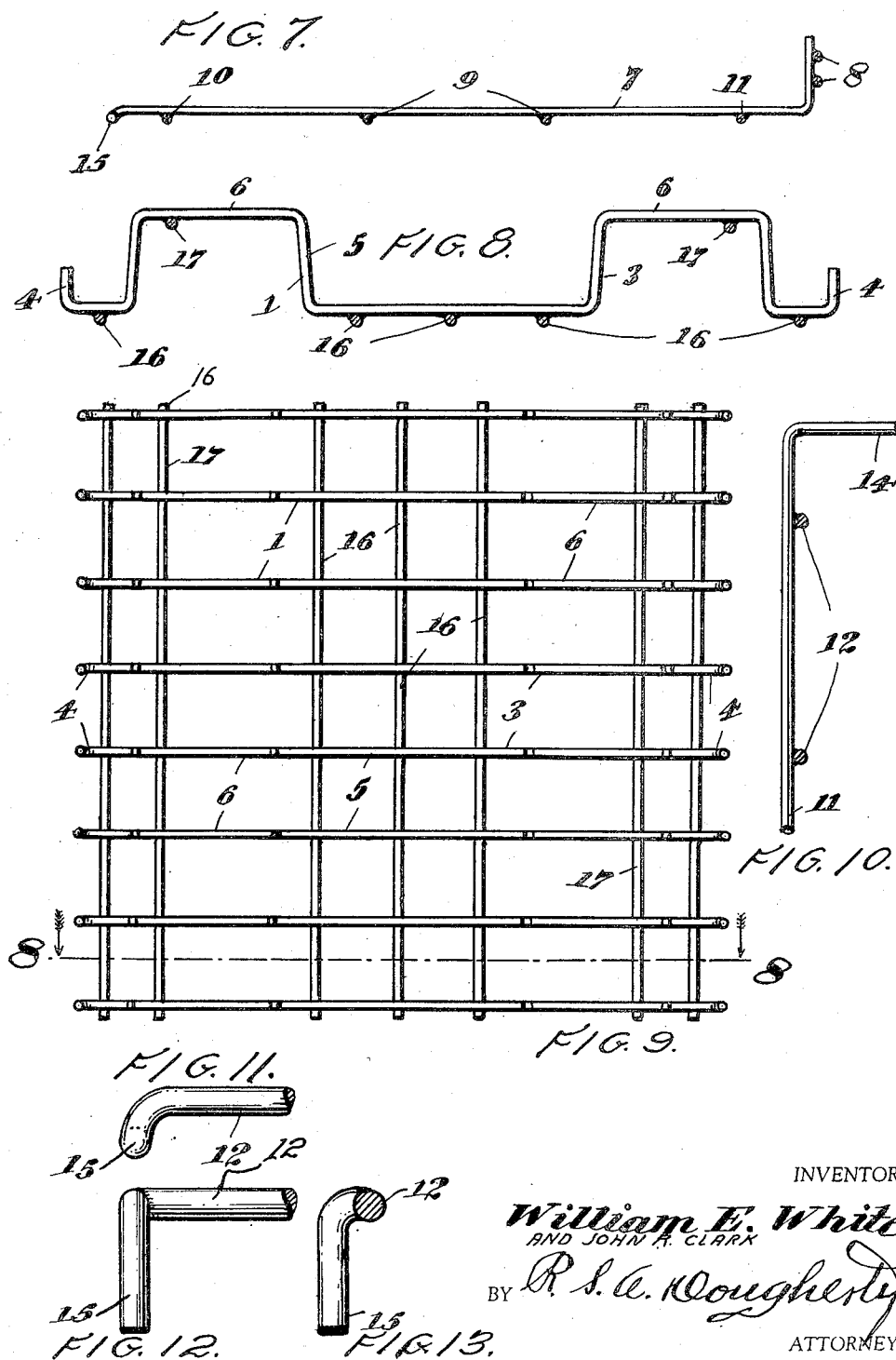

Feb. 19, 1957  W. E. WHITE ET AL  2,781,901
BRICK CAGE
Filed Jan. 11, 1954  5 Sheets-Sheet 4
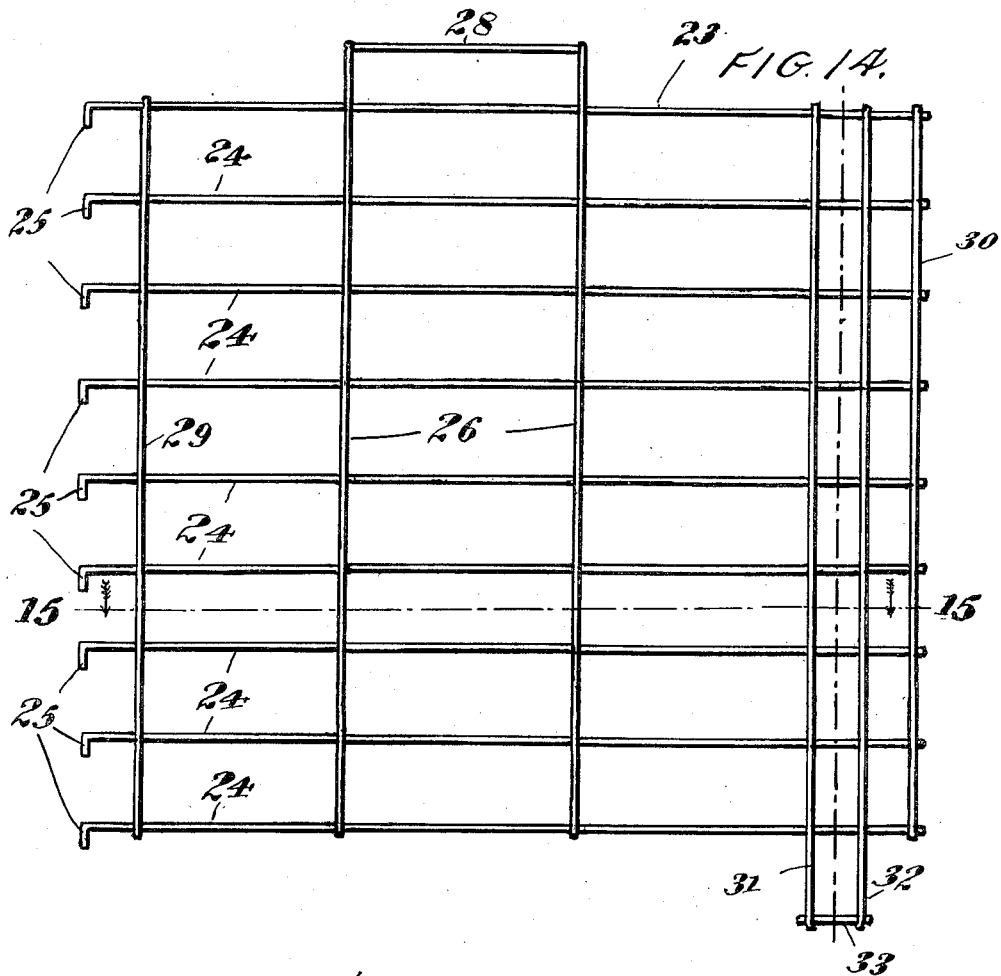
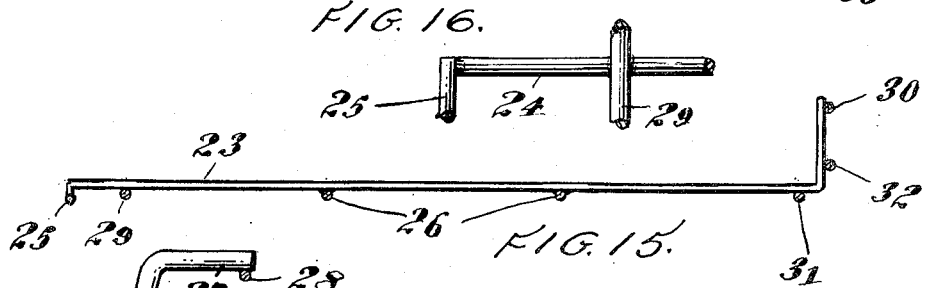
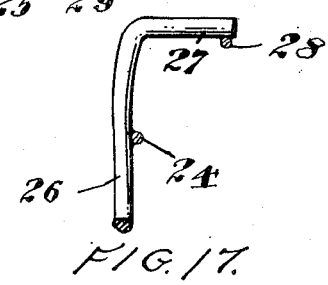
INVENTORS
William E. White.
AND JOHN R. CLARK
BY R. S. G. Dougherty
ATTORNEY Feb. 19, 1957 W. E. WHITE ET AL 2,781,901
BRICK CAGE
Filed Jan. 11, 1954 5 Sheets-Sheet 5

INVENTORS
William E. White.
AND JOHN R. CLARK
BY R. S. A. Dougherty.
ATTORNEY

United States Patent Office 2,781,901
Patented Feb. 19, 1957

2,781,901
BRICK CAGE

William E. White, Bethlehem, Pa., and John R. Clark, Silver Spring, Md., assignors, by mesne assignments, to said John R. Clark and Thomas Somerville III, Kenwood, Md., trustees Application January 11, 1954, Serial No. 403,275

10 Claims. (Cl. 206—65)

This invention relates in general to brick packaging means and more particularly to a combination of metal pallet and caging means for holding a predetermined number of bricks in a tight unitary assembly for handling and transport.

The present application is a continuation-in-part of our co-pending application, Serial No. 290,266, filed May 27, 1952, now Patent No. 2,770,359, granted November 13, 1956, for Pallets and Containers for Transporting Brick and the Like.

For convenience in handling with fork lift trucks and the like, it is obviously very desirable that small heavy objects of fairly regular dimensions and susceptible to breakage such as bricks and concrete blocks be packaged in large standardized units which will effectively resist rough handling. Since such items are normally sold in lots of thousands, it is further desirable that the packages shall contain approximately even fractions (or multiples) of this count.

The standard size of building brick is nominally 8½ in. long x 4¼ in. wide x 2¼ in. thick, so that a cubed package in multiples of these dimensions is at once suggested. Theoretically, then, the inside of a container adapted to receive bricks in rows of four laid lengthwise should be exactly 34 inches wide. In practice, however, we have found that the range of size differences in individual bricks is such as to require containers of at least two optional internal dimensions, with 33¼ in. and 34½ in. being normally adequate to accommodate the variations in dimensions to be expected in a pile of average bricks held tightly together as well as variations resulting from the fact that the nominal length and width of a brick are not multiples of the nominal thickness.

One object of this invention, therefore, is to provide a light and strong pallet of welded members for supporting a unitary pile of bricks or the like;

Another object is to provide reticulated caging members which are quickly and easily applied and will protect and confine said pile of bricks as a separate integral unit which will not snag or interlock with other units during shipment; and A further object is to provide means for strengthening the corners of the caging members and to render them adjustable so as to closely accommodate dimensional variations in the articles enclosed therein.

Still other objects, purposes and advantages of the invention will be noted hereinafter in the specification and claims, and in the annexed five (5) sheets of drawings.

In the drawings:

Fig. 2 is a side elevation of one of the caging elements;

Fig. 3 is a fragmentary side elevation illustrating the manner of fastening corner detents of the caging elements so as to form a brick package of relatively small size;

Fig. 4 is a fragmentary top plan view of contiguous caging elements at the corners of two such separate packages of bricks;

Fig. 5 is a fragmentary side elevation similar to Fig. 3, but illustrating the engagement of corner detents for a package of maximum dimensions;

Fig. 6 is a fragmentary top plan view similar to Fig. 4, but illustrating the mode of fastening the corner detents as in Fig. 5 so as to form a brick package of maximum dimensions;

Fig. 7 is a horizontal section of a caging element taken on the line 7—7 of Fig. 2;

Fig. 8 is a vertical section of the pallet, taken on the line 8—8 of Fig. 9;

Fig. 9 is a top plan view of the pallet;

Fig. 10 is an enlarged detail section illustrating one of the inwardly bent vertical members which by resting on top of the brick pile function as suspension members for the caging elements;

Figs. 11, 12 and 13 are detail views of one of the side detent hooks; and

Fig. 14 is a side elevation of a modification of the caging element;

Fig. 15 is a horizontal section of said modified caging element taken on the line 15—15 of Fig. 14;

Fig. 16 is a detail view of one of the offset detent hooks of said element;

Fig. 17 is a detail view of one of the inwardly bent suspension members of said modified caging element;

Figure 1:
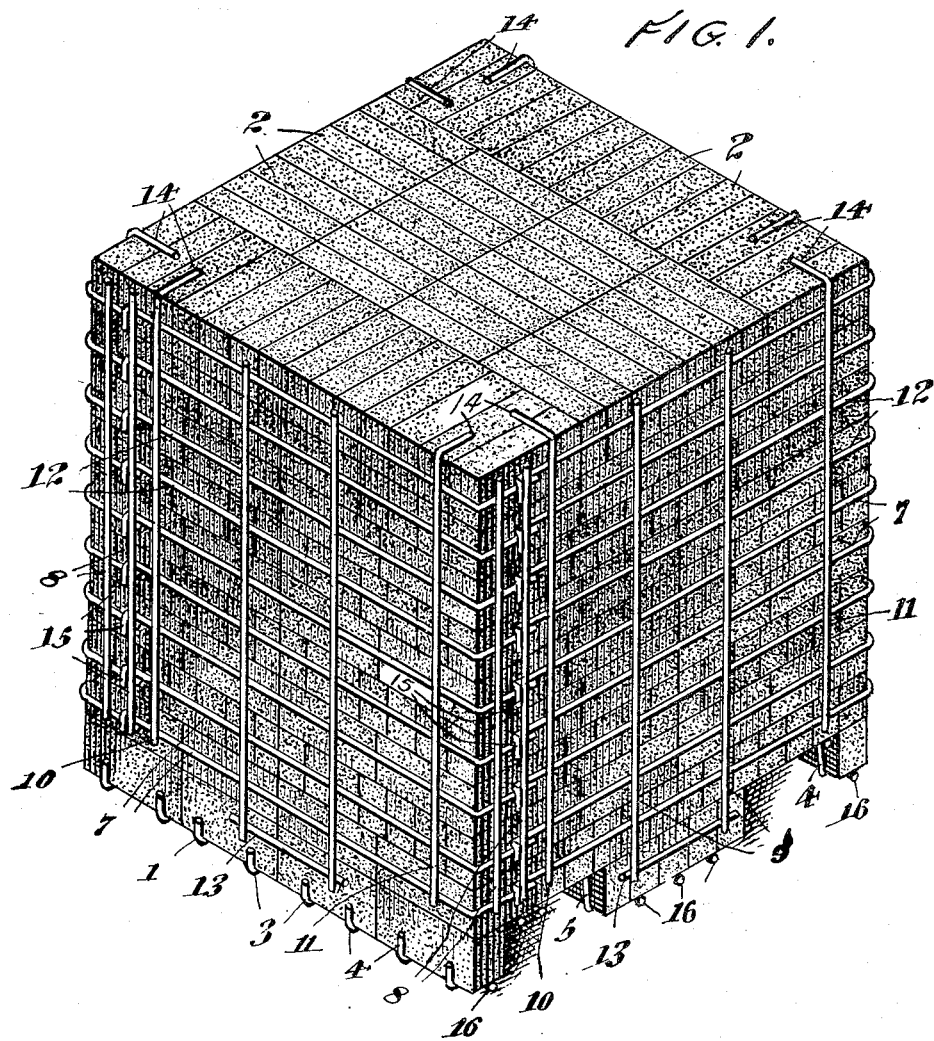
Fig. 1 is a perspective view of a package of bricks held in assembled relation on the pallet by side caging elements.

Referring particularly to Figs. 8 and 9 of the drawings, the pallet 1 supporting the interlocked pile of bricks 2 is a reticular metal structure formed of a plurality of lateral wires 3 bent to provide U-shaped outer side legs 4, a wider center leg 5, and elevated flat intermediate portions 6 of sufficient width to receive the fork members (not shown) of a lift truck.

Said lateral wires 3 are held in evenly spaced parallel relation by a plurality of longitudinal wires 16 securely welded in place beneath said legs 3, 4 and 5, and by additional longitudinal wires 17 welded beneath the elevated flat portions 6 near the side legs 4. Thus, when the fork members lift the loaded pallet, the interposed wires 17 tend to raise the sides of the pallet sufficiently to keep the load properly centered on the somewhat flexible pallet.

The pallet shown is adapted to hold twenty-eight bricks in parallel rows of four bricks laid on edge lengthwise in said legs 4 and 5, and to support nine superposed layers of fifty-six interlocked bricks on edge thereon, or a total of 532 bricks, although the specific number of bricks to a package may obviously be varied to suit the convenience of the individual user.

Figure 18:
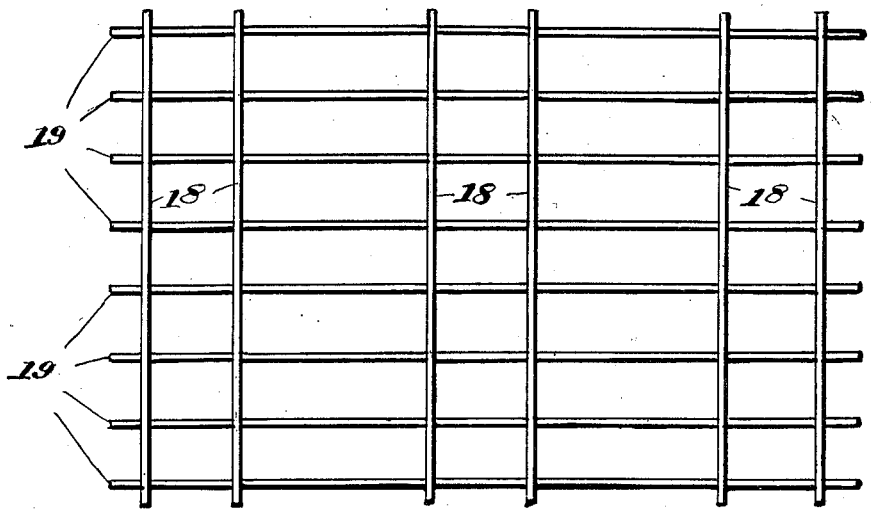
Fig. 18 is a bottom plan view of a section of welded wire fabric before it is bent to form a modified pallet.
Figure 19:
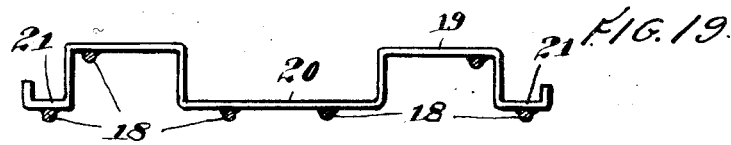
Fig. 19 is a transverse vertical section of said modified pallet in completed form.
Figure 20:
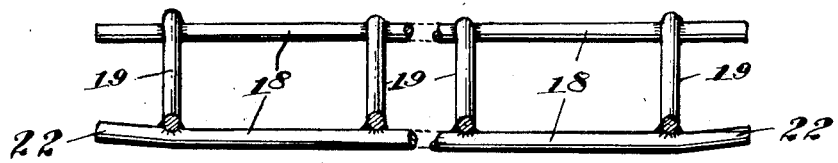
Fig. 20 is a broken longitudinal vertical section taken centrally through the modified pallet of Fig. 19.

A modified and preferable form of pallet may also be made from a sheared flat sheet of welded wire fabric as in Fig. 18, comprised of three evenly spaced pairs of longitudinal wires 18 and a plurality (eight being shown) of overlying lateral wires 19, bent to the shape shown in Fig. 19, so that the center pair of longitudinal wires 18 supports the load of the bricks in the center leg 20, and the remaining four longitudinal wires 18 individually support the loads of the bricks above the side legs 21 and the adjacent fork-engaging portions of the pallet. In this pallet, the ends of the longitudinal wires 18 under the legs 20 and 21 are preferably bent slightly upward, as at 22 in Fig. 20, to guard their digging into car floors during transit.

A brick pile of this type may be handled to a limited extent by a fork lift truck or the like on the pallet alone, but for maximum strength and safety in handling it is necessary to provide additional means to guard against any possible lateral shifting or displacement of the bricks.

Referring now to Figs. 2–7 and 10–13 inclusive, we have therefore provided four identical side panels 7, each comprising a reticular fabric of welded vertical and horizontal members, which panels are adapted to function upon assembly as caging elements for the bricks. The vertical members of each panel comprise a relatively closely spaced pair of detent wires 8 near one side edge of the panel and extending approximately from the second layer of bricks to near the top of the pile, a central pair of wires 9 somewhat more widely spaced apart and extending from the bricks in the pallet's center leg 5 to near the top of the pile also, and intermediate wires 10 and 11 extending upward from the second layer of bricks and positioned between said central pair of wires 9 and the opposite ends of the spaced parallel transverse wires 12, which latter with the short center bottom wire 13 comprise the horizontal members.

The extended upper ends 14 of the intermediate wires 10 and 11 are bent at a right angle horizontally inward as shown in Fig. 10 so as to rest on the top of the brick pile.

The side edge of the panels carrying the detent wires 8 is bent backward at a right angle along the dotted line of Fig. 2 to form one corner of the enclosure.

The side edge of the panel furthest removed from the vertical end wires 8 is provided with outwardly offset and downwardly bent hooks 15 (Figs. 11–13), which are formed upon the ends of at least some and preferably all the transverse wires 12 at that side edge, and which permit all the connections at a corner to be made simultaneously and with only one hand.

As another modification, adaptable for use with either type of pallet, we may also use four of the identical side panels 23, shown in Figs. 14–17, in preference to the above-described side panels 7 as the caging elements for the bricks.

The transverse members of each such panel 23 comprise a plurality of spaced parallel horizontal wires 24, each of which is provided at one end with the outwardly offset and downwardly bent hooks 25.

The vertical members of said panel 23 include a central pair of wires 26 extending upwardly from about the middle of the second row of bricks, said pair of wires 26 being elongated sufficiently to provide inwardly bent portions 27 (Fig. 17) connected at their inner ends by a short horizontal wire 28 welded thereunder and adapted to rest on the top of the brick pile.

The side edge of the panel 23 is bracked near the hooks 25 by an intersecting vertical wire 29. The opposite side edge of said panel has another vertical wire 30 welded thereto and is bent backward along the dotted vertical line of Fig. 14, being further braced by the downwardly extended vertical wires 31 and 32 and the connecting bent horizontal wire 33 near the bottom of the pile so as to provide a strongly reinforced corner for the enclosure. The wires 30 and 32 have the further function of serving as alternative detents for engaging the hooks 25 of the next adjacent panel.

The steel wires of the pallet and panels should be of at least No. 4 gauge or heavier for assurance of sufficient strength and rigidity to protect the brick package.

In use, after the pile of interlocked bricks 2 has been placed upon the pallet, the panels 7 or 23 are placed upright at each side of the pile and hung on said pile by means of the inwardly bent wire extensions. The said panels are then fastened together manually at the corners by engaging the offset hooks 15 or 25 of each panel with whichever set of the vertical detent wires of the adjacent panel will fit the panels better onto that particular brick pile.

Each single shipment of bricks will include a number of such packages, usually in compactly arranged groups three packages wide and five packages long. If the bricks in a package are not absolutely tight when the caging is placed around them, the offset hooks 15 or 25 are free to slide for a limited distance along the transverse wires. This telescoping effect renders the corners of the package completely self-adjusting, and permits any loose bricks in one package to be compressed together simply by shoving the next package tightly against it, so that said first package will retain its integrity during transit by rail or truck.

If it is required to hold any or all of said offset hooks 15 or 25 more securely in place, there may be attached thereto twisted tie wires or hooked resilient wire clips (not shown), suitable types of the latter being disclosed in our co-pending joint application, Serial No. 290,266, filed May 27, 1952, for Pallets and Containers for Transporting Brick and the Like.

Although we have thus described our invention hereinabove in considerable deatil, we wish it to be understood that the present disclosure is intended to be illustrative, rather than restrictive, and that modifications, substitutions and equivalents may be resorted to without departure from the scope or spirit of the appended claims.

We claim:

1. An enclosure for objects stacked in a rectangular pile, the walls of said enclosure comprising a plurality of panels, each panel being formed of intersecting horizontal and vertical wires, the horizontal wires at one side edge of said panel being bent at right angles to the principal plane of the panel and having thereon vertical wires spaced apart and forming alternative detents, and at least some of the horizontal wires at the other side edge of said panel being offset outwardly and bent downwardly and forming hook members engaging a detent on an adjoining panel.

2. A package, comprising a plurality of objects stacked in a rectangular pile, panels arranged in rectangular relationship around said pile, each panel being formed of horizontal wires and vertical wires welded together at their intersections, the upper ends of certain of the vertical wires being bent inward and adapted to rest upon the top of the pile, the horizontal wires at one side edge of the panel being bent backward and having thereon spaced vertical wires forming alternative detents, and the horizontal wires at the other side edge of said panel being offset and bent downwardly and forming hook members, each hook member resting upon the corresponding horizontal wire of an adjoining panel and engaging a detent thereon.

3. A package, comprising a plurality of objects stacked in a rectangular pile, a plurality of substantially identical panels enclosing said pile, each panel being formed of horizontal wires and vertical wires, the lower ends of at least some of said vertical wires extending downwardly to engage the bottom layer of objects, the upper ends of at least some of the vertical wires being also bent horizontally inward to rest upon the top of the pile, adjacent vertical wires at one side edge of said panel being spaced apart sufficiently to provide alternative detents, and the extended ends of at least some of the horizontal wires at the other side edge of said panel being offset outwardly and bent downwardly to form hook members engaging a detent on an adjoining panel.

4. A unitary brick package comprising a pallet, superposed interlocked bricks stacked in a rectangular pile on said pallet, and removable reticular panels composed of horizontal and vertical members engaging the sides of said brick pile, the horizontal members on one side edge of each panel terminating in outwardly offset hooks, and certain of the vertical members on the opposite side edge of each panel being in spaced relation as detents alternatively engaging said hooks.

5. In a brick package as claimed in claim 4, the vertical members of each panel including a pair of wires extending substantially from the top to the bottom of the brick pile on each side of a corner of said pile, and a bent horizontal wire connecting the bottom ends of said pair of wires.

6. In a brick package as claimed in claim 5, the vertical members of each panel additionally including a central pair of spaced wires having elongated inwardly bent upper portions.

7. In combination with a brick package as claimed in claim 6, a short horizontal wire connecting the ends of said upper portions of each pair of central spaced wires and resting on the top of the bricks in said package.

8. An enclosure for objects stacked in a rectangular pile comprising a plurality of panels, each panel being formed of horizontal and vertical wires joined at their intersections, the horizontal wires at one side of the panel being bent rearwardly at right angles to the main body of the panel, a vertical detent wire secured to the rearwardly bent wires and spaced inwardly from the plane of the panel, the horizontal wires at the other side of the panel being offset outwardly and bent downwardly to form hook members resting on the horizontal wires of an adjoining panel and engaging the intersection of the detent wire therewith.

9. An enclosure for objects stacked in a rectangular pile comprising a plurality of panels, each panel being formed of horizontal and vertical wires joined at their intersections, the horizontal wires at one side of the panel being bent rearwardly at right angles to the main body of the panel, detents upon the horizontal wires at one side of the panel, and hook members upon the horizontal wires at the other side of the panel, said hook members engaging the detents and intersecting horizontal wires on an adjoining panel.

10. A pallet comprising a plurality of spaced similarly bent horizontally positioned wires, each wire having offset portions defining only two spaced downwardly facing channel forming portions and an intermediate upwardly facing channel forming portion and terminal upwardly facing channel forming portions at each end, the offset portions defining the bottoms of the channel forming portions being in alignment, and wires extending at right angles to the first named wires and welded thereto and securing the first named wires rigidly together with the corresponding portions thereof in planar alignment wherein the downwardly opening channel forming portions coact to form channels for lifting forks in the so-formed pallet.

References Cited in the file of this patent
UNITED STATES PATENTS

| | | |
|---|---|---|
| 1,922,560 | Sullivan | Aug. 15, 1933 |
| 2,544,743 | Vrabcak | Mar. 13, 1951 |
| 2,546,830 | McKim | Mar. 27, 1951 |
| 2,554,355 | Arthur | May 22, 1951 |
| 2,605,070 | Fletcher | July 29, 1952 |
| 2,648,455 | Bitney | Aug. 11, 1953 |
| 2,658,444 | Wheeler | Nov. 10, 1953 |
| 2,660,328 | Averill | Nov. 24, 1953 |
| 2,668,681 | Kappen | Feb. 9, 1954 |